United States Patent [19]

Salisbury

[11] Patent Number: 5,357,399

[45] Date of Patent: Oct. 18, 1994

[54] MASS PRODUCTION METHOD FOR THE MANUFACTURE OF SURFACE MOUNT SOLID STATE CAPACITOR AND RESULTING CAPACITOR

[75] Inventor: Ian Salisbury, S. Devon, England

[73] Assignee: AVX Corporation, New York, N.Y.

[21] Appl. No.: 951,128

[22] Filed: Sep. 25, 1992

[51] Int. Cl.$^5$ .............................................. H01G 9/05
[52] U.S. Cl. ..................................... 361/529; 29/25.03
[58] Field of Search ...................... 361/529, 541, 321.1, 361/322, 328, 330; 29/25.03

[56] References Cited

U.S. PATENT DOCUMENTS

| | | | |
|---|---|---|---|
| 3,117,365 | 1/1964 | Belko | 361/308.1 |
| 3,538,571 | 11/1970 | Callahan | 29/25.41 |
| 3,617,834 | 11/1971 | Rayburn | 361/321.2 |
| 3,635,754 | 1/1972 | Howatt | 428/349 |
| 3,787,961 | 1/1972 | Tomiwa | 29/25.03 |
| 3,889,357 | 6/1975 | Millard | 29/25.03 |
| 3,992,761 | 11/1976 | McElroy | 29/25.42 |
| 4,045,867 | 9/1977 | Ström | 29/856 |
| 4,059,887 | 11/1977 | Galvagni | 29/25.03 |
| 4,090,231 | 5/1978 | Millard et al. | 361/529 |
| 4,107,762 | 8/1978 | Shirn | 361/534 |
| 4,188,706 | 2/1980 | Millard | 29/25.03 |
| 4,494,299 | 1/1985 | Franklin et al. | 361/540 |
| 4,520,430 | 5/1985 | Long | 361/529 |
| 4,539,623 | 9/1985 | Irikura | 361/540 |
| 4,574,438 | 3/1986 | Diepers | 29/25.35 |
| 4,599,788 | 7/1986 | Love et al. | 29/25.03 |
| 4,660,127 | 4/1987 | Gunter | 361/540 |
| 4,780,796 | 10/1988 | Fukuda | 361/525 |
| 4,899,258 | 2/1990 | Gourvernelle | 361/534 |
| 4,907,131 | 3/1990 | Neal | 361/534 |
| 4,945,452 | 7/1990 | Sturmer | 361/529 |
| 4,959,652 | 9/1990 | Hirama | 361/310 |

FOREIGN PATENT DOCUMENTS

| | | | |
|---|---|---|---|
| 4087315 | 3/1992 | Japan | 29/25.03 |
| 2121604 | 12/1983 | United Kingdom | 29/25.03 |

OTHER PUBLICATIONS

Proceeding of the 28th Electronics Components Conference, Anaheim Calif., Apr. 1978, pp. 422–426 "A New Tantalum Chip Capacitor" Richard T. Millard & David M. Cheseldine.

Primary Examiner—Bruce A. Reynolds
Assistant Examiner—Michael D. Switzer
Attorney, Agent, or Firm—Mark T. Basseches

[57] ABSTRACT

A method of simultaneously forming a multiplicity of surface mountable solid state capacitors is disclosed. The method comprises mounting on a substrate a wafer of powdered solid state capacitor forming metal, sintering the wafer and metal together to fuse the interface between wafer and substrate to each other and convert the wafer into a porous integral mass, dividing the sintered wafer into a multiplicity of mutually spaced sub-units, isolating the interface or boundary between the substrate and sub-units one from the other by a resin infusion or by a dielectric deposition step, causing the sub-units to be converted to capacitors by sequential anodizing and manganizing steps, bonding a cathode plate to the counter electrode components present on the upper surfaces of the sub-units in electrical contact therewith, filling the voids between adjacent sub-units with insulative resin material by injecting same between the plates utilizing the plates as elements of a mold, and after hardening of the resin sawing through the plates and hardened resin to define discrete encapsulated capacitors. The disclosure further teaches solid state capacitors formed by the noted method.

20 Claims, 3 Drawing Sheets 5,357,399

MASS PRODUCTION METHOD FOR THE MANUFACTURE OF SURFACE MOUNT SOLID STATE CAPACITOR AND RESULTING CAPACITOR

BACKGROUND AND FIELD OF THE INVENTION

The present invention is in the field of solid state capacitors and is directed more particularly to a mass production method for manufacturing surface mountable solid state capacitors and to the resultant capacitor.

DEFINITIONS

As employed herein the term solid state capacitor is intended to mean a capacitor formed by the method of providing a powdered mass of solid state capacitor forming metals (as hereinafter defined), compressing the mass to form a predetermined shape, sintering the compressed mass to integrate the mass into a unitary porous state, chemically reacting, e.g. by anodizing the porous mass to form a dielectric coating over the metallic surfaces within the mass, and thereafter forming a conductive coating over the dielectric coating (manganizing).

In the solid state capacitor the metallic components which have been anodized define the anode of the capacitor and the conductive or manganized coating over the dielectric forms the cathode or counter electrode.

The term solid state forming metals, as used herein, are defined as metals useful in the fabrication of solid state capacitors. Solid state metals include one or more of the following: tantalum, niobium, molybdenum, silicon, aluminum, titanium, tungsten, zirconium, and alloys of the above. The principal solid state metals currently in use are tantalum and to a lesser degree niobium.

Anodizing, as this term is used in the present application, is intended to mean the formation on the spongy metallic surfaces throughout the porous sintered mass of solid state metal a dielectric coating, typically by immersing the sintered metal in an electrolyte, i.e. a phosphoric acid solution, while the metal is connected to a positive source of DC current as respects a cathode immersed in the bath.

The term manganizing is intended to refer generically to the step of forming a conductive counter electrode coating over the dielectric resulting from anodizing. The manganizing step is typically performed by dipping the anodized device in a solution of manganous nitrate and heating the impregnated device in a moist atmosphere to convert the nitrate to a solid conductive manganese dioxide.

Both the anodizing and manganizing steps are well known in the art of forming solid state capacitors and may vary in accordance with the solid state metal employed, and the intended end characteristics of the capacitor.

PRIOR ART

Solid state capacitors are valued due in large measure to the fact that extremely high capacitances may be provided in a relatively limited volumetric space as a result of the large surface area of metal within the sintered porous mass. It is, for example, feasible to provide a tantalum capacitor having a value of 50 to 100 MFD at working voltages of about 10 volts in a capacitor body having a volume of 0.027 cc.

Heretofore, much of the benefit of compactness was compromised as a result of the necessarily large encapsulation methods employed. More particularly, an appreciation of the advance of the instant invention may best be derived by reference to the conventional mode of fabricating commercially available solid state capacitors.

In such manufacture, the end of a rod of tantalum metal is applied to a mass of compressed tantalum powder. The rod is bonded to the tantalum powder mass by co-sintering the rod and powder or by welding the rod to a pre-sintered mass of the powder. Thereafter, the prefabricated units are anodizing and manganized, such procedures being typically carried out by gripping the tantalum rods and utilizing such rods as a "handle" for the succeeding steps.

The capacitor implants must now be packaged in a manner enabling their use in commercial applications. Due in large measure to the fragility of the bond between the anode rod and tantalum mass, it is necessary typically to encase the capacitor in a lead frame construction having terminations permitting attachment to a PC board or the like. Typically, lead frame attachment involves effecting a cathode connection to the body of the capacitor and effecting welds between the anode rod and other portions of the lead frame, encapsulating the device while still connected to the lead frame, and thereafter severing connections between projecting portions of the lead frame and remainder thereof to provide the finished capacitor.

As is well known to those skilled in the art, the described conventional solid state capacitor manufacturing techniques are replete with manufacturing difficulties and result in a finished capacitor package, the volume of which is several times the volume of the actual capacitance generating components. As noted, the connection between anode rod and capacitor body is fragile and great care must be taken during processing of the capacitor preforms during the anodizing, manganizing, and subsequent steps.

Additionally, welding of solid state metals, as is necessary in conventional manufacture, is a difficult procedure.

In the described conventional process great care must be taken to assure that the cathode coating does not short to the anode rod and the necessity of spacing these components further increases the overall size of the component.

Finally, and perhaps most importantly, in addition to the expense of lead frame fabrication, the large volumetric space occupied by the finished capacitor is counter-indicated in modern manufacturing procedures wherein miniaturization is at a premium.

Representative examples of conventional solid state tantalum capacitors and their method of manufacture are described and illustrated in U.S. Pat. Nos. 4,059,887; 4,520,430; 4,780,796 and 4,945,452.

Representative examples of solid state capacitors manufactured utilizing the lead frame method include U.S. Pat. Nos. 4,107,762; 4,539,623; 4,660,127; 4,899,258 and 4,907,131.

Listed below are references located in connection with a search of the art conducted in respect of the instant invention.

U.S. Pat. No. 3,117,365 discloses ceramic capacitors formed by depositing U-shaped electrode patterns on a large sheet of dielectric, stacking the sheets such that the bases of the U's exit from opposite surfaces of the stack and thereafter cutting to define individual capacitors which are then terminated.

U.S. Pat. No. 3,538,571 discloses green ceramic sheets embossed to provide discrete raised areas which are thereafter electroded.

U.S. Pat. No. 3,617,834 relates to a ceramic multilayer capacitor formed by providing a block of capacitors with overlapping edges and severing the block in the areas of overlap to provide termination areas.

U.S. Pat. No. 3,635,759 discloses forming multilayer ceramic capacitors by applying ceramic in binder onto a porous screen, applying suction, depositing liquid metal and repeating this operation until a multilayer structure is formed, which is thereafter fired and cut to form individual capacitors.

U.S. Pat. No. 3,992,761 discloses a method of terminating capacitors by embedding a multiplicity of ceramic capacitors in a block of plastic with the ends exposed. Terminations are applied to the exposed ends and the block is thereafter dissolved to removed the capacitor bodies therefrom.

U.S. Pat. No. 4,045,867 relates to a method of molding polymer compound about capacitors involving passing termination wires upwardly through holes in the bottom of plastic preforms, attaching the wires to the capacitor, introducing the capacitors into the preforms, filling the preforms with resin and curing.

U.S. Pat. No. 4,574,438 shows a pressure sensitive transducer made by forming a metallic layer on a substrate, forming a piezo electric dielectric layer over the metal, cutting grooves through the dielectric and metal and into the body of the substrate, filling the grooves with plastic, forming photo-lithographic spacers over portions of the device in registry with the filled grooves and finally applying a cover having electrodes directed normal to the grooves.

U.S. Pat. No. 4,959,652 shows formation of surface mountable capacitors of the metalized plastic type made by winding individual capacitors, coating the terminations by vapor deposition using a metal having a higher melt point than the solder which will be used to attach the capacitor to a PC board, coating the capacitor with resin and then grinding away portions of the resin to expose desired parts of the underlying metal termination material.

SUMMARY OF THE INVENTION

The present invention may be summarized as directed to an improved method of manufacturing simultaneously a multiplicity of surface mountable solid state capacitors and to the improved capacitor resulting therefrom.

Briefly stated, the method involves providing a substrate of metal preferably comprised of the same metal as or a metal compatible with the solid state metal from which the capacitor will be formed. A compressed wafer of powdered solid state metal is mounted on the substrate, the wafer being of a size many times larger than the size of the individual capacitors. The wafer and substrate are co-sintered to bond the wafer to the substrate and to integrate the powder into a porous mass.

The sintered wafer is divided into a multiplicity of sub-units by cuts formed through the wafer and perpendicular to the substrate. Either before or after the subdivision the wafer and/or sub-divided units are anodized and manganized, it being understood that if the anodizing and manganizing procedures are carried out prior to sub-division, the anodizing and manganizing steps are again repeated after sub-division. The areas between the discrete sub-units are treated, preferably by a resin injection step, so as to isolate the interface between the substrate and wafer from other areas of the wafer so that the manganizing steps do not short circuit the substrate, which will form the anode of the device, with the cathode of the capacitor.

A metal member is applied to the upper surface of the processed wafer in mechanical and electrical contact with such upper surface which forms the counter electrode. The void areas between the discrete capacitors formed as a result of the cutting step or steps previously performed are now filled by injecting resin into the space defined between the substrate and counter electrode plate which act in the manner of components of a mold whereby the entirety of the spaces defined by the cuts are filled with insulating resin material.

Finally, the composite is cut along cutting lines which register with the previously formed cuts, i.e. through the counter electrode plate, the resin separating the individual capacitors, and the substrate, whereby there are formed finished capacitors which are already encapsulated except at the ends defined by the counter electrode plate and the substrate, which components define the terminations of the capacitor permitting attachment of the capacitor as a surface mount on the PC board, the substrate forming the anode and the counter electrode the cathode of the capacitor.

As will be appreciated by skilled workers in the art familiar with conventional solid state capacitors and their methods of manufacture, numerous advantages flow from the manufacturing method generally described.

Firstly, by eliminating the conventional anode wire, the volumetric efficiency of the capacitor, i.e. the capacitance obtained within a particular volume of unit is increased by a factor to two to three times.

Additionally, major manufacturing difficulties such as handling the preform using an anode wire and welding of the anode wire, as well as the necessity for employing lead frames are completely eliminated. The method further eliminates the industry wide problem of a short circuiting between the anode wire and the cathode coating covering conventional solid state capacitors.

An important advantage of the invention resides in the ability of providing as a stock item a substrate with a sintered solid state metal wafer bonded thereto. This item may be tailored to form capacitors of desired capacitance by simply varying the spacing of cuts formed in the wafer and, hence, capacitor size.

Importantly, the costs of encapsulation are significantly reduced by virtue of the utilization of the counter electrode plate and substrate in effect as boundaries of a gang mold for injection of insulating resin which separates the individual capacitors and, after sawing, forms the final encapsulation of the finished capacitor.

It is accordingly an object of the invention to provide a novel method for the mass manufacture of surface mountable solid state capacitors and to the resultant improved capacitor.

A further object of the invention is the provision of a method of manufacturing surface mountable solid state capacitors wherein elements of the encapsulating materials of the finished capacitors perform a function during the manufacturing process, namely isolating the anode-substrate from the subsequently formed counter electrode components of the capacitor.

A still further object of the invention is the provision of a method of manufacturing solid state capacitors and resulting capacitor which eliminates fragile connection between anode rod and tantalum mass, and between anode rod and termination component providing a durable and reliable structure.

BRIEF DESCRIPTION OF DRAWINGS

Referring now to the drawings

DETAILED DESCRIPTION OF THE DRAWINGS

Figure 1:
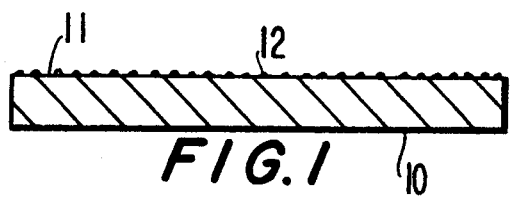
FIGS. 1 through 9 are schematic sectional views illustrating the sequential steps of manufacturing a capacitor in accordance with a first embodiment of the invention.

Referring now to the drawings, there is disclosed in FIGS.1 through 9 a sequential series of sectional views illustrating various steps of manufacturing capacitors in accordance with the invention in accordance with a first embodiment thereof.

As will be evident to those skilled in the art the dimensions and proportions of the various elements have been exaggerated for purposes of clarity.

In FIG. 1 there is disclosed a substrate 10 of solid state metal illustratively tantalum. To the upper surface 11 of substrate 10 there is preferably applied a thin layer of tantalum grains 12, which are fused to the substrate, the grains 12 functioning to provide a roughened surface to augment bonding of the wafer 13 as will be described hereinbelow. As an alternate to the grains 12 the surface 11 may be roughened.

To the upper surface 11 of substrate 10 there is applied a wafer 13 comprised of compressed tantalum powder admixed with binder to form a coherent mass. As is known in the art, the particles defining the powder forming wafer 13 may vary in size ranges and such grain size will determine the eventual characteristics of the resultant capacitors. The wafer 13 and substrate 10 are thereafter co-sintered to initially burn-off the organic binders and thereafter to convert the powder of wafer 13 into an integral porous mass. The sintering also bonds the lower surface 14 to the upper surface 11 of substrate 10 mechanically and electrically connecting the touching surfaces.

By way of illustration and without limitation, the substrate may vary within a optimal range of 0.005 to 0.03 inches in thickness. The seeding powder 12 employs grains larger that the wafer powder and may vary in accordance with the powder size employed in the wafer 13 and by way of illustration may optimally be in the range of from about 100 to 800 microns.

By further way of example and assuming that the substrate and powder are comprised of tantalum, a sintering at 2000 degrees C. for period of from 5 to 60 minutes will be effective to create the desired bonding and porosity, the time factor being a function of particle size and mass of material forming the wafer. The processing of solid state capacitor forming metals including the formation of pellets, sintering steps and further processing steps (anodizing and manganizing) necessary to convert the porous mass into a capacitor are all well known in the art and the description thereof will be included herein only briefly, since such processing steps do not form a part of the instant invention.

Figure 2:
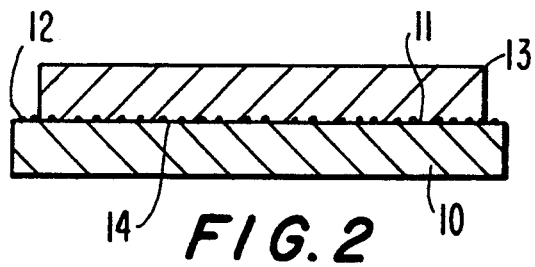

The substrate 10 and sintered wafer 13, as illustrated in FIG. 2, is next subjected to sawing steps by cuts effected perpendicular to the plane of substrate 10 in a crisscross pattern (see FIG. 3a) to divide the wafer 13 into a multiplicity of discrete capacitor forming units 15. The cuts are preferably effected to a depth to expose the surface 11 of substrate 10 or slightly to penetrate the surface. Optionally, as a means for facilitating handling of the composite comprised of the substrate 10 and wafer 13, the substrate may be embedded in a block of resin (not shown) to a depth which exposes the upper surface and wafer.

Figure 3:
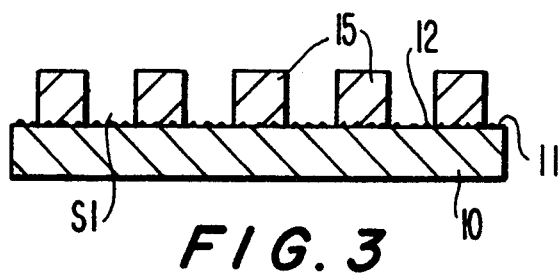
Figure 3A:
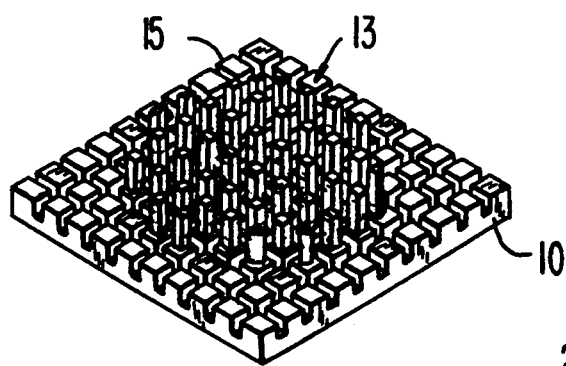
FIG. 3a is a perspective view of a sub-assembly shown at the stage of FIG. 3.

The subdivided composite article of FIGS. 3 and 3a is thereafter subjected to processing steps to convert the porous sintered mass of the wafer remaining after the sawing steps into capacitors. The processing steps are well known in the art and comprise an anodizing step, wherein the wafer is immersed in an electrolyte bath, i.e. a 0.1% phosphoric acid solution, while connecting the substrate to a positive source of DC current as respects a cathode immersed in the bath. This procedure results in the conversion of the portions of the wafer exposed to the solution, as well as the exposed portions of the substrate into a dielectric material, illustratively where the metal employed is tantalum to tantalum pentoxide.

The capacitor forming procedure includes subsequent formation of a counter electrode, the counter electrode forming step being effected, for example, by dipping the composite article in solution of manganous nitrate, thereafter heating the device in a moist atmosphere to about 325 degrees C. to convert the nitrate to conductive manganese dioxide. The process of anodizing and manganizing may be repeated a multiplicity of times as is conventional to assure formation of a desired dielectric and over coating of counter electrode, it being understood that repetition is required due to ruptures or breaks in the dielectric which may be formed as a result of heating during fabrication of the counter electrode, such ruptures or breaks being necessarily re-anodized to assure non-shorting between the anode (defined by the tantalum metal) and the cathode or counter electrode (defined by the manganizing process).

The steps of treating the porous tantalum mass to form a capacitor are described in detail in U.S. Pat. Nos. 4,059,887 and 4,945,452, which are herein incorporated by reference.

Figure 4:
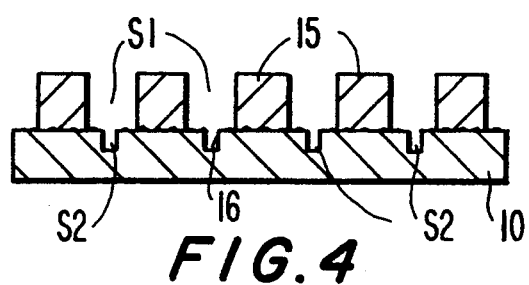

As shown in FIG. 4 a second series of saw cuts S2 is formed in alignment with the first series of saw cuts S1, the saw cuts S2 penetrating more deeply into the substrate and defining channels 16 therein. At this point, it should be noted that the sequence of treating the material of the wafer by anodizing and manganizing is not critical to the invention. For example, it is feasible to anodize and manganize the entire wafer 13 before effecting saw cuts S1 and S2 or to effect saw cuts before treatment of the wafer. Of course, if anodizing is effected before cutting, it will be necessary to re-treat the saw cut composite by again anodizing and manganizing. The sequence of treatment is best determined by trial and error and is dependent upon such factors as the size of the individual capacitors, the nature (particle size) of the solid state metal powder selected and the like as well known in the art.

Figure 5:
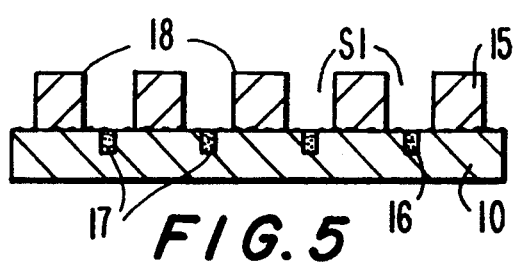
Figure 9:
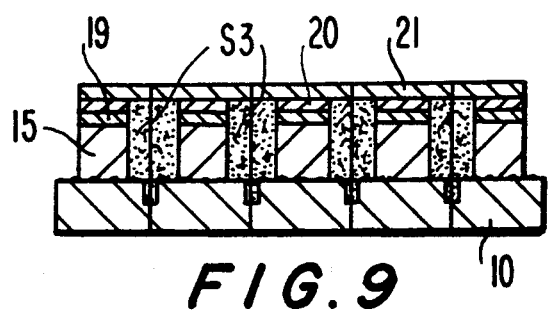

As shown in FIG. 5 the channels 16 have been filled to the level of the surface 11 or slightly thereabove with resinous insulating composition 17. While optimally, the resin employed may be a liquid epoxy, any of a wide variety of liquid resins which subsequently harden may be employed.

Desirably, following formation of the second saw cuts S2 and in advance of filling the channels, the device is subjected to a further anodizing step to provide a anodizing insulative layer over the metal exposed by the saw cuts S2.

As will be apparent from the preceding description, the resin 17 (and the post saw cut anodizing step) have assured that the sole electrical connection between the metallic components of the sintered tantalum powder forming wafer 13 is at the surface 11 forming the interface between the discrete capacitor forming members 15 and the substrate.

Figure 6:
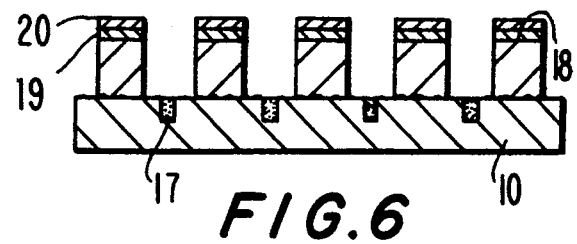

As shown in FIG. 6, the upper surfaces 18 of the elements 15 have been provided, as is conventional, with a first layer 19 of conductive carbon and a covering layer 20 of silver thereby to effect electrical connection to exterior (upper) surface portions of the counter electrode formed by manganizing.

Figure 7:
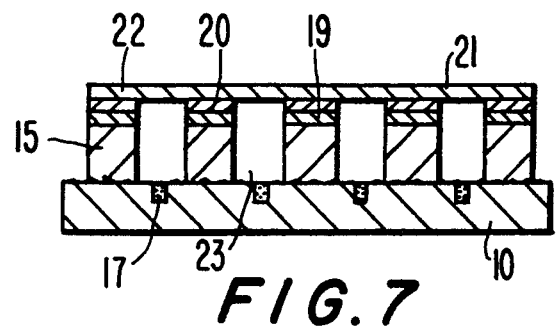

As shown in FIG. 7, a cathode plate 21 has been affixed, i.e. by a conductive adhesive, to the upper surface 22 of the silver coating 20. Following setting of the adhesive, the voids 23 defined by the initial saw cut S1 are filled with liquid insulating resin material (e.g. epoxy) and permitted to cure. Filling of the areas is greatly facilitated by the fact that the substrate 10 and cathode plate 21 together define a cell for containing injected resin.

Figure 8:
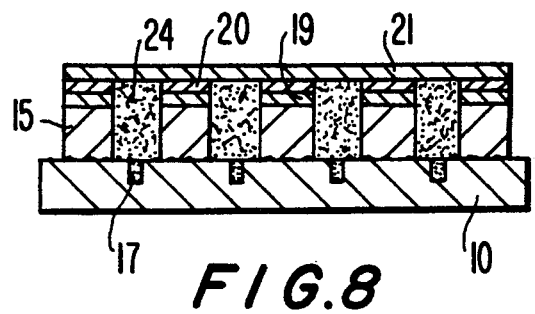
Figure 10:
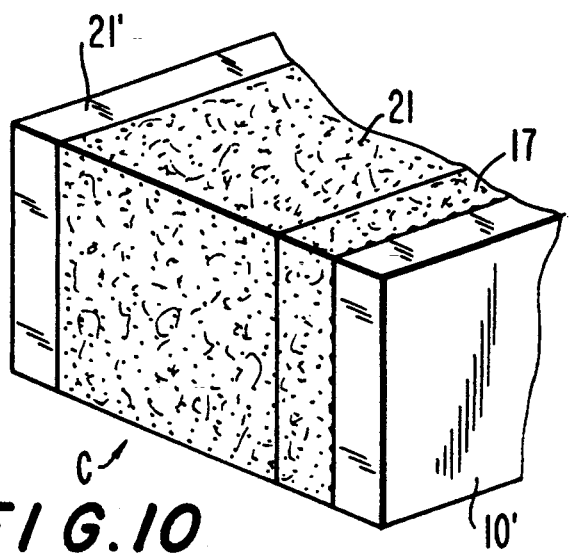
FIG. 10 an enlarged fragmentary perspective view of a finished capacitor in accordance with the invention made by the method of FIGS. 1 through 9.
Figure 11:
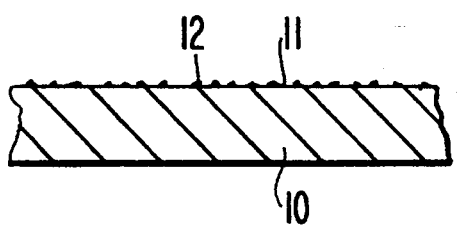
FIGS. 11 through 19 are schematic sectional views depicting a variation of the method at progressive stages.
Figure 12:
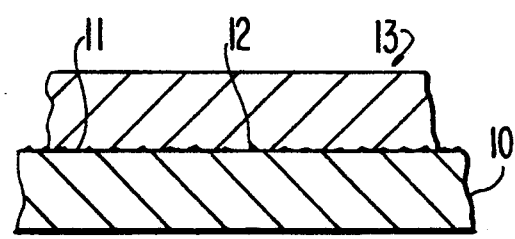
Figure 13:
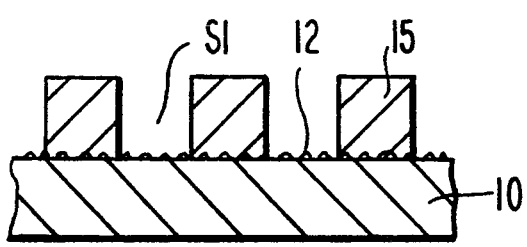
Figure 14:
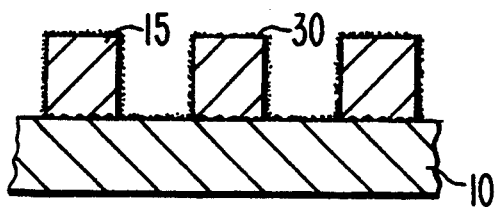
Figure 15:
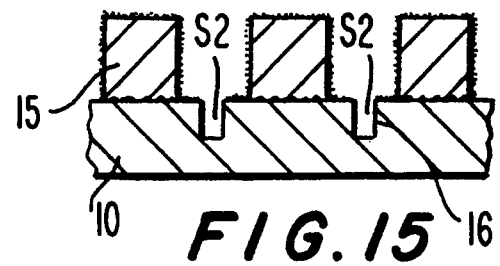

Finally, the composite unit illustrated in FIG. 8 is cut along saw lines S3 which register with saw lines S1 and S2, the sawing step resulting in the formation of finished capacitors C as illustrated in FIG. 10.

As will be apparent, no further processing or encapsulating are required, the saw cuts S3 defining finished encapsulated solid state capacitors. The capacitors are surface mountable, the anode 10' being comprised of a segment of substrate 10 and the cathode or counter electrode 21' being comprised of an increment of the cathode plate 21.

A significant advantage of this invention resides in the ability to fabricate preforms (FIG. 2) comprised of a stock size of substrate and wafer 13. It is possible by merely varying the spacing of the saw cuts to produce capacitors of a variety of end characteristics in accordance with the requirements of a particular user. Without limitation, and in compliance with the best mode requirements, a preferred manufacturing sequence for the practice of the method of FIGS. 1 through 9 is as follows:

SEQUENCE OF MANUFACTURE

1. Provide tantalum substrate.
2. Apply tantalum grains and heat to bond grains to substrate.
3. Apply and sinter tantalum wafer to integrate powder and bond to substrate and thereafter anodize.
4. Manganize.
5. Saw wafer (S1).
6. Form dielectric over saw cuts.
7. Add first resin barrier (17).
8. Manganize.
9. Apply carbon coat.
10. Apply silver coat.
11. Bond cathode plate using conductive adhesive.
12. Inject second resin encapsulation (24).
13. Cut wafer into discrete capacitors.

Illustrated in FIGS. 11 through 19 is a modification of the method described in conjunction with FIGS. 1 through 9. The primary distinction between the methods resides in the elimination of the first resin infusing step which results in the addition of resin components 17.

In the description of the procedures as illustrated in FIGS. 11 through 19, like parts have been given like reference numerals to those used in respect of the description of FIGS. 1–9.

Figure 16:
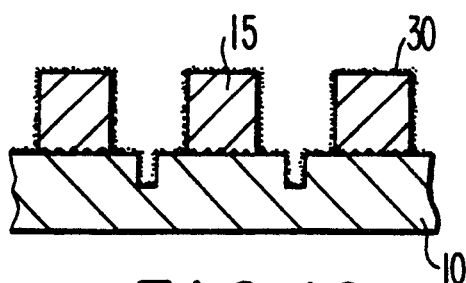
Figure 17:
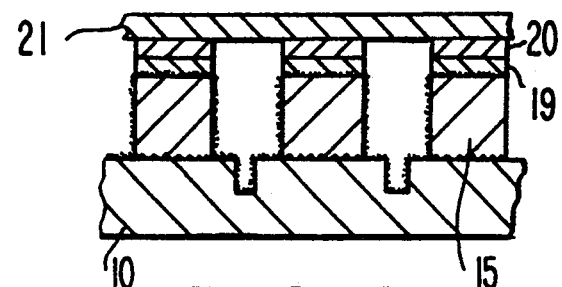
Figure 18:
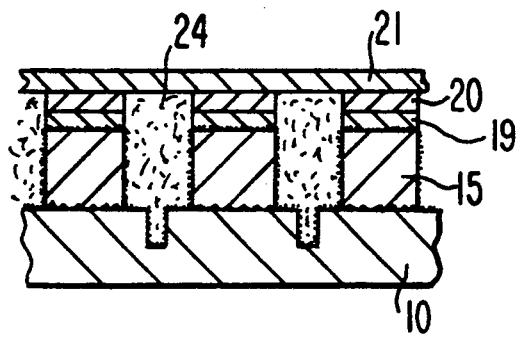
Figure 19:
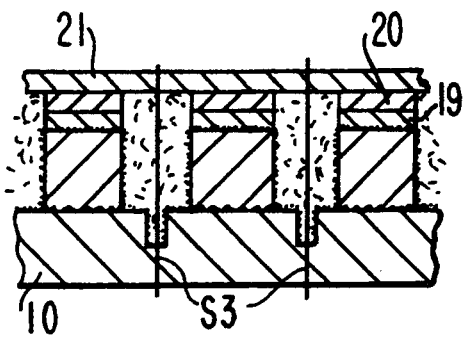
Figure 20:
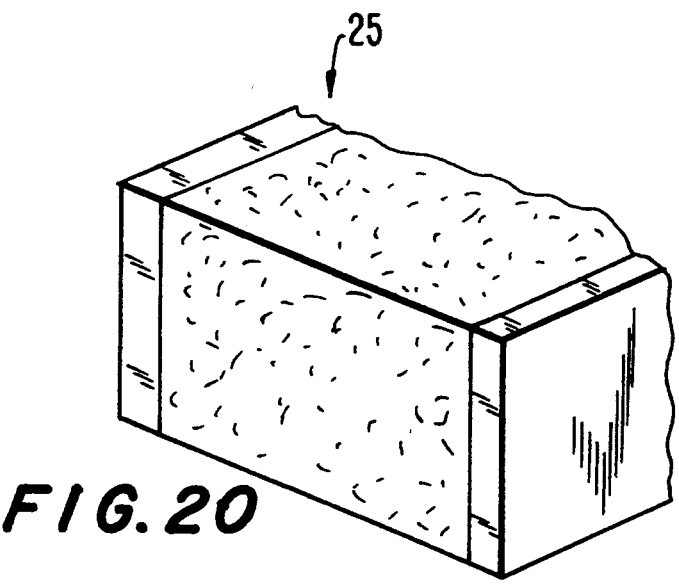
FIG. 20 is an enlarged fragmentary perspective view of a finished capacitor made in accordance with the method of FIGS. 11 through 19.

In accordance with the embodiment (FIGS. 11–19), following formation of the first saw cut (S1) the capacitor sub-components 15 and exposed surfaces of the substrate 10 are provided with a dielectric coating 30 to seal any exposed metallic components exposed by the saw cuts and, thus, provide an insulating barrier protecting the boundary between substrate and base of members 15. The device is thereafter manganized following which a second series of narrower saw cuts (S2) are formed in registry with saw cuts S1. Thereafter, the composite is subjected to a further dielectric forming step to assure that the edges exposed by saw cuts S2 are sealed by the dielectric coating (FIG. 16). The composite is thereafter manganized to define a counter electrode and processed as before, i.e. by the application of carbon layer 19, silver layer 20 and application of cathode plate 21. The voids between the capacitor members 15 are thereafter filled with resin insulating mass 24 as before and are sawed along the saw lines S3 to define the finished capacitor 25, illustrated in FIG. 20.

As with the method as described with respect to FIGS. 1 through 9 the sequence of steps may be varied to a degree. With regard to the embodiment of FIGS. 11 through 19 a preferred sequence is as follows:

SEQUENCE OF MANUFACTURE (FIGS. 11 through 19)

1. Roughen or sinter metal particles to substrate.
2. Mount wafer and co-sinter wafer and substrate.
3. Form dielectric.
4. Saw to level of substrate (S1).
5. Further dielectric formation to seal metal exposed by saw.
6. Manganize.
7. Form deep cuts (S2) into substrate.
8. Re-anodize to form dielectric in grooves defined by S2 sawing step.
9. Manganize.
10. Apply carbon and silver to upper edges of capacitors.
11. Attach cathode plate to silver surfaces using conductive adhesive.
12. Inject resin.
13. Separate individual capacitors by saw cuts (S3).

As will be apparent from the preceding description, there is disclosed herein novel methods of forming solid state capacitors. Common to the methods of the invention is the provision between a cathode plate and an anode plate of a multiplicity of solid state capacitors separated by void areas, the voids being filled with insulating-encapsulating resin, the individual capacitors being separated from the matrix only after the capacitors have been completely formed and encapsulated. The final sawing step results in the provision of surface mountable capacitors which are fully encapsulated and terminated, the severed edges of the substrate defining the anode termination and the edges of the cathode plate defining the counter electrode or cathode termination.

The capacitor resulting from practice of the process represents a highly efficient use of space providing a package whose volume is only about a third of the volume of conventional solid state capacitors. Unlike such conventional capacitors which are subject to failure based on dislodgement of the anode rod from the sintered pellet and also as a result of fracture of the anode rod connection to the termination, the capacitor of the present invention is virtually failure proof.

The manufacturing methods are further unique in that the resin components in addition to functioning as encapsulation of the finished capacitor function in addition as a means for facilitating the manufacturing procedure by forming isolations of the anode from the counter electrode (Method 1) and in accordance with both described variations, rigidify the matrix during the final sawing operations.

As will be apparent to those skilled in the art and familiarized with the instant disclosure numerous variations in structural details and methodology will occur without departing from the spirit of the invention. Accordingly, the inventions is to be broadly construed within the scope of the appended claims.

Having thus described the invention and illustrated its use, what is claimed as new and is desired to be secured by Letters Patent is:

1. The method of simultaneously forming a multiplicity of solid state capacitors which comprises the steps of providing a metallic substrate, mounting on said substrate a wafer of powdered solid state capacitor forming metal having a lower surface engaging said substrate and an upper surface parallel to and spaced from said substrate, sintering said wafer and substrate to bond said lower surface to said substrate and integrate the powder of said wafer into a porous mass, dividing said wafer into a plurality of discrete units by forming a first series of cuts in planes perpendicular to said substrate, subjecting said wafer to an anodizing step to form a dielectric coating throughout said porous mass, forming a conductive counter electrode coating over said dielectric coating, said counter electrode coating covering said upper surface, electrically and mechanically coupling to said counter electrode coating on said upper surface a metallic member parallel to said substrate, injecting insulating material between said substrate and member to substantially fill the voids between said discrete units of said wafer formed by said first series of cuts, and thereafter forming a second series of cuts parallel to and in registry with said first series through said metallic member, insulating material and substrate.

2. A surface mountable solid state capacitor formed in accordance with the method of claim 1.

3. The method of claim 1 wherein said first series of cuts is effected to a depth to define channels in said substrate, the method including filling said channels with insulative material at least to the level of said surface of said substrate prior to formation of said counter electrode coating.

4. A surface mountable solid state capacitor formed in accordance with the method of claim 3.

5. The method of claim 1 and including the step of fusing granular increments of said solid state metal of larger particle size than the particle size of the powder of said wafer to said substrate in advance of mounting said wafer.

6. A surface mountable solid state capacitor formed in accordance with the method of claim 5.

7. The method of claim 1 wherein said solid state capacitor forming metal comprises tantalum.

8. A surface mountable solid state capacitor formed in accordance with the method of claim 7.

9. The method of claim 7 wherein at least the uppermost surface of said substrate comprises tantalum.

10. A surface mountable solid state capacitor formed in accordance with the method of claim 9.

11. The method of simultaneously forming a multiplicity of solid state surface mountable capacitors comprising the steps of providing a planar metallic substrate having an upper surface, mounting on said surface of said substrate a wafer of powdered solid state capacitor forming material having a lower surface engaging said upper surface of said substrate and a top surface parallel to and spaced from said substrate, sintering said wafer and substrate together to bond said wafer to said substrate and integrate said powder into a porous mass, dividing said sintered wafer into a plurality of discrete sub-units by forming a first series of cuts through said wafer in planes perpendicular to said substrate, said cuts extending at least to the level of said upper surface, forming a second series of cuts in registry with said first series, said second series of cuts being of lesser width than said first series and extending below said upper surface of said substrate to define channels in said substrate, filling said channels with a first insulating resin mass, thereafter sequentially anodizing and manganizing said sub-units to provide solid state capacitors having a counter electrodes exposed at said top surface, electrically and mechanically bonding a conductive cathode plate to said top surface, filling the void spaces between said substrate and cathode plate resulting from said first series of saw cuts with insulative material, and thereafter forming a third series of cuts in registry with said second series through said cathode plate, resin mass, insulative material and substrate.

12. A surface mountable solid state capacitor formed in accordance with the method of claim 11.

13. The method of claim 11 and including the step of mounting granular increments of said solid state metal of larger particle size than the particle size of said powder on said upper surface of said substrate and fusing said increments to said upper surface in advance of mounting said wafer thereon.

14. A surface mountable solid state capacitor formed in accordance with the method of claim 13.

15. The method of claim 13 wherein said solid state metal comprises tantalum.

16. A surface mountable solid state capacitor formed in accordance with the method of claim 15.

17. The method of manufacturing encapsulated, terminated, surface mountable solid state capacitors comprising providing a preform comprising metallic anode and cathode plates, said plates having disposed therebetween a multiplicity of solid state capacitors, said capacitors being mutually spaced apart to define channels therebetween, said capacitors having anode terminals fused to said anode plate and cathode terminals electrically and mechanically bonded to said cathode plate, injecting liquid insulative resin into said channels utilizing said plates as boundaries of a mold, causing said resin to harden, and thereafter severing said plates and resin along lines coincident with said channels.

18. An article of manufacture comprising a surface mountable solid state capacitor formed by the method of providing an integral planar metallic anode plate, forming on said anode plate a multiplicity of mutually spaced apart solid state capacitors separated by channels, said capacitors having anode portions electrically and mechanically bonded to said anode plate and cathode portions disposed in coplanar alignment and in spaced parallel relation to said anode plate, electrically and mechanically bonding an integral planar cathode plate to said cathode portions of said capacitors, and thereafter cutting simultaneously through said anode and cathode plates along severance lines in registry with said channels and perpendicular to said plates.

19. The article of claim 18 formed by the further step of substantially completely filling said channels with insulating material in advance of said cutting step.

20. A surface mountable solid state capacitor formed by the method of providing a metallic planar substrate, applying to said substrate a wafer of powdered solid state capacitor forming metal, said wafer having a lower surface engaging said substrate and an upper surface spaced from and parallel to said substrate, sintering said wafer while in contact with said substrate to integrate said powdered metal into a porous mass and electrically and mechanically bond said wafer to said substrate, dividing said sintered wafer into a plurality of discrete units along first severance lines perpendicular to said substrate, anodizing said units to provide a dielectric coating, forming a conductive counter-electrode coating over said dielectric coating, said counter-electrode coating covering said upper surface, electrically and mechanically bonding a planar unitary metallic anode plate to said upper surface in covering relation of said plurality of units, and thereafter forming a second series of cuts perpendicular to said substrate through said anode plate and substrate in registry with said first severance lines.

* * * * *